US010931679B2

(12) United States Patent
Nandi et al.

(10) Patent No.: US 10,931,679 B2
(45) Date of Patent: Feb. 23, 2021

(54) SERVICE ACTIONS FOR DIGITAL ASSISTANTS

(71) Applicant: Microsoft Technology Licensing, LLC, Redmond, WA (US)

(72) Inventors: Ajoy Nandi, Snoqualmie, WA (US); Zain Aziz, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 813 days.

(21) Appl. No.: 15/176,013

(22) Filed: Jun. 7, 2016

(65) Prior Publication Data
US 2017/0353392 A1    Dec. 7, 2017

(51) Int. Cl.
*H04L 29/06* (2006.01)
*G06F 21/41* (2013.01)

(52) U.S. Cl.
CPC ............ *H04L 63/104* (2013.01); *G06F 21/41* (2013.01)

(58) Field of Classification Search
CPC ............................... H04L 47/10; H04L 63/08
See application file for complete search history.

(56) References Cited

U.S. PATENT DOCUMENTS

| 7,275,162 | B2 | 9/2007 | Wiederin et al. | |
|---|---|---|---|---|
| 8,346,889 | B1 | 1/2013 | Chiu et al. | |
| 8,706,503 | B2* | 4/2014 | Cheyer | G06F 17/3087 704/275 |
| 9,044,504 | B1 | 6/2015 | Sirota et al. | |
| 9,098,363 | B2 | 8/2015 | Schmidt et al. | |
| 2006/0026010 | A1* | 2/2006 | van Moorsel | G06Q 10/10 705/400 |
| 2009/0082014 | A1* | 3/2009 | Kryszkiewicz | H04W 48/18 455/432.1 |
| 2009/0313093 | A1* | 12/2009 | Doyle | G06Q 10/00 705/7.39 |
| 2012/0144452 | A1* | 6/2012 | Dyor | H04L 63/0884 726/4 |
| 2013/0311997 | A1* | 11/2013 | Gruber | G06Q 10/10 718/102 |
| 2014/0114705 | A1* | 4/2014 | Bashvitz | G06Q 50/14 705/5 |

(Continued)

OTHER PUBLICATIONS

Amazon "AWS Lambda Developer Guide", (Apr. 30, 2016), pp. 1-346 https://web.archive.Org/web/20160430050158/https://docs.aws.amazon.com/lambda/latest/dg/lambda-dg.pdf (Year: 2016).*

(Continued)

*Primary Examiner* — Tri M Tran
(74) *Attorney, Agent, or Firm* — Merchant & Gould P.C.

(57) ABSTRACT

In representative embodiments, a digital assistant is extended by service activities. A service activity executes as a service as part of the digital assistant. A service activity specifies a set of user data to be provided when invoked, at least one insight used to invoke the service activity in a proactive way and at least one intent used to invoke the service activity in a reactive way, and executable code that is executed when the service activity is invoked. A development environment provides templates to ease development of service activities. Service activities in development can be deployed alongside production services with access to service activities in development restricted to a set of authorized users.

20 Claims, 6 Drawing Sheets

(56) References Cited

U.S. PATENT DOCUMENTS

2014/0245253 A1     8/2014    Goldfeder
2016/0344874 A1*   11/2016    Fadell .................. H04M 15/00

OTHER PUBLICATIONS

Vogels, Werner., "Amazon announces the Alexa Skills Kit, Enabling Developers to Create New Voice Capabilities", Published on: Jun. 25, 2015 Available at: http://www.allthingsdistributed.com/2015/06/alexa-skills-kit.html.

"AWS Lambda FAQ", Retrieved on: Apr. 7, 2016 Available at: https://aws.amazon.com/lambhda/faqs/.

Davies, Alex., "Amazon opens Alexa voice platform to developers with SDK", Published on: Jul. 3, 2015 Available at: http://rethink-iot.com/2015/07/03/amazon-opens-alexa-voice-platform-to-developers-with-sdk/.

Ricky., "Microsoft announced new Cortana features, Outlook, Android, and third-party app integration", Published on: Mar. 30, 2016 Available at: http://www.gsmarena.com/microsoft_announced_improvements_to_cortana_outlook_and_thirdparty_app_integration-news-17536.php.

Edwards, Samuel, "Why Google Now Is Integrating So Many Third Party Apps", Published on: May 27, 2015 Available at: http://www.audiencebloom.com/2015/05/why-google-now-is-integrating-so-many-third-party-apps/.

Pratap, Ketan., "Microsoft's Cortana Assistant Gets New Features Including Outlook Integration", Published on: Mar. 31, 2016 Available at: http://gadgets.ndtv.com/apps/news/microsofts-cortana-assistant-gets-new-features-including-outlook-integration-820008.

"StackStorm vs. AWS Lambda: Event-Driven Computing vs. Event-Driven Operations", Published on: Nov. 20, 2014 Available at: https://stackstorm.com/2014/11/20/stackstorm-vs-aws-lambda-event-driven-computing-vs-event-driven-operations/.

"Cloud Dataflow", Retrieved on: Apr. 7, 2016 Available at: https://cloud.google.com/dataflow/.

* cited by examiner

SERVICE ACTIONS FOR DIGITAL ASSISTANTS

FIELD

This application relates generally to digital assistants. More specifically, embodiments disclosed herein illustrate extension of native digital assistant services with third party service actions. Other disclosed embodiments illustrate development and deployment of extension service actions.

BACKGROUND

Digital assistants have been making inroads in various aspects of people's lives. The purpose of these digital assistants are to make the life of the user easier by automating tasks, performing various tasks on behalf of a user, and surfacing important information. The currently available digital assistants rely on a narrow set of information or commands. Since digital assistants reside in closed environments, the owner of the digital assistant is responsible for evolving the narrow set of information or commands applicable to a particular digital assistant.

DETAILED DESCRIPTION

Figure 1:
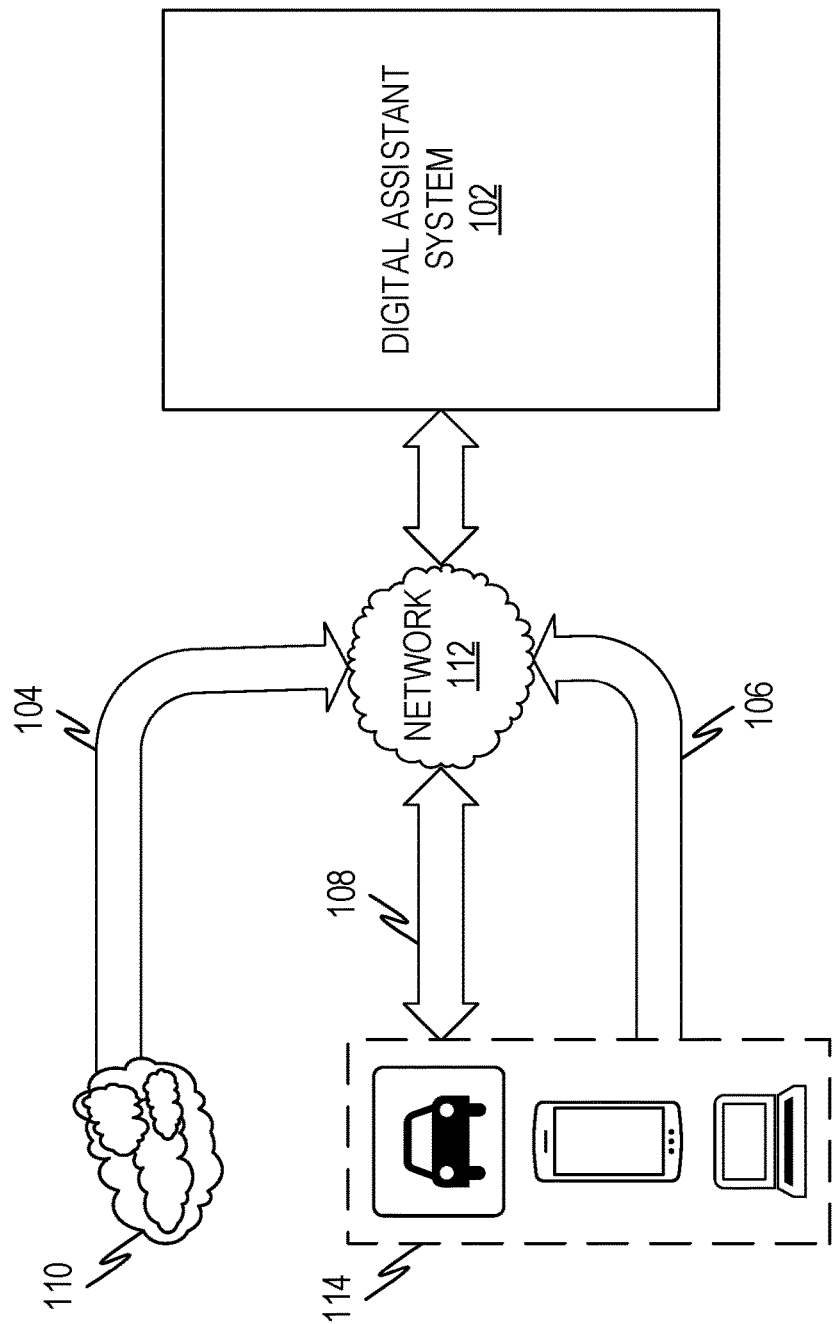
FIG. 1 illustrates an example of a digital assistant system.

The description that follows includes illustrative systems, methods, user interfaces, techniques, instruction sequences, and computing machine program products that exemplify illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Overview

The whole purpose of digital assistants is to bring information to the attention to a user and to perform tasks on behalf of a user. In the context of this disclosure a digital assistant is a system, collection of systems, service, collection of services, and/or combinations thereof that collect information from or about a user, provide tips to the user, and/or perform various tasks on behalf of the user.

Thus, users want and expect digital assistants to provide a wide variety of services and perform a wide variety of tasks. For example, a digital assistant that is able to book a flight, make reservations, follow up on packages, order items, pay bills, and a wide variety of other tasks is valuable to a user. Each of these tasks tends to reside in a particular domain. However, digital assistants reside on closed platforms and typically have limited interactivity in a few domains. It is beyond the capability of even the largest company to provide all the services that a user may want. Furthermore, business and others providing solutions in a particular domain are protective of their customers and market and thus it can be difficult for a digital assistant to expand capabilities in a particular domain.

Another problem facing providers of digital assistants is the fact that digital assistants tend to be built on closed platforms without the ability for others to integrate with the platform. Thus interoperability is limited or non-existent for digital assistants. For the limited interoperability that is available on some digital assistants, those desiring to interoperate with a digital assistant either maintain their own infrastructure to execute services that interoperate with the digital assistant or acquire infrastructure from a third party to execute services that interoperate with the digital assistant. These hurdles make it extremely difficult for digital assistants to expand the services they provide into other domains.

Embodiments described below solve these technical problems by providing an extensible digital assistant architecture and by providing development tools to help a developer, service provider, or other entity to create service actions that can execute on the digital assistant architecture alongside native services provided by the digital assistant. Furthermore, integration with the digital assistant to extend the services offered to the user is further eased by not requiring the service provider to provide separate infrastructure to execute integrated services. Thus costs for executing service actions can be based on utilization by users in order to minimize cost and expense to integrating with the digital assistant.

A new service not native to the digital assistant is provided to users by integrating a service action into the digital assistant architecture. Resources are provided to developers to ease development of service actions that integrate with the digital assistant architecture. These resources can include templates, software development kits (SDKs), and other resources that pre-populate the code implementing a service action with the needed integration with the digital assistant architecture. The digital assistant architecture allows a developer to specify, through the code, what user data is needed and/or desired to provide the service to the user, what insights are needed and/or desired about the user to provide the service to the user, and what type of proactive requests by a user should trigger the service action. The developer then provides methods needed to implement and provide the service, such as methods that are executed when the service action is invoked, methods to implement the service, and methods executed when the service processing is complete.

The development architecture allows a service action in development and testing to be deployed to the digital assistant with access restricted to a designated set of users. The digital assistant architecture provides metrics and other diagnostic information to the developer, such as through a developer portal, dashboard, management console or similar, to allow the developer to monitor and debug service actions in development.

An approval process may be used once the developer is satisfied with the state of the service action in order to catch misbehaving service actions, or to ensure service actions comply with security, privacy or other policies.

Deployment to the digital assistant architecture is accomplished by the development environment submitting the approved service action to the digital assistant architecture. Once deployed, the service action becomes available and begins showing up for use by users. A deployed service action is invoked either in a proactive or reactive manner. In the proactive scenario, when an insight that the service action subscribes to becomes active, the service action is invoked with the relevant user data and insight information. In this way, events that happen can be used to trigger the service action without the user having to specifically invoke the service action. As a representative example, a digital assistant may comprise a set of rules that include a rule which specifies that whenever a user is within a 20 m radius of the user's home, the temperature is set to 70 F. That way as soon as a user approaches home, the house starts to heat up.

In the reactive scenario, a user submits a request to the digital assistant. When the request contains the trigger information of the service activity, the digital assistant invokes the service action with the relevant user data and request information. In this way the service action is invoked in response to a user request. As a representative example, a user may ask a digital assistant to set an appointment with the cable company at a free time on her calendar on Friday.

The disclosed digital assistant architecture also allows added service actions to be restricted to a set of users. The service actions of such services are only invoked, proactively or reactively, for the designated set of users.

The resultant architecture provides a unique user experience for users of the digital assistant. In one aspect service actions are used to expand the services offered by the digital assistant for all users. In another aspect, service actions are used to expand services offered for only a designated set of users, either for development purposes or as part of a restricted service.

DESCRIPTION

FIG. 1 illustrates an example of a digital assistant system 102. In operation, the digital assistant system 102 uses information from various data sources (104/106) and, in combination with a plurality of rules, identifies when an event, sequence of events, combined set of information, and/or so forth cause the digital assistant system 102 to take one or more actions in accordance with the rules. Actions can include presenting information to a user. The information presented to a user will be referred to herein as a "card" and can include information in any format such as text, audio, and so forth. Cards can include not only information but actions and/or options for a user to select. As a representative example, if a user asks the digital assistant system 102 to book a reservation at a close restaurant for lunch for three people, the digital assistant system 102 may respond with a card that shows open reservation times at close restaurants and ask the user if she would like to book one of the reservations. Upon selecting one of the presented options, the digital assistant system 102 can book the indicated reservation.

The digital assistant system 102 can be implemented on a system or on a plurality of systems such as those described below. Often all or part of the inference system is implemented in conjunction with one or more cloud architectures so that one or more cloud services are provided and utilized.

The data sources (i.e., 106) can include user devices and/or systems 114 (hereinafter user devices 114). The user devices 114 can include personal devices such as a wearable device (i.e., watch, band, glasses, and so forth), a carry-able device (i.e., mobile phone, tablet, laptop, and so forth), a stationary or semi-stationary device (i.e., portable computer, desktop computer, hub, and so forth), and/or server devices and/or services (i.e., servers, cloud services, calendar systems, email systems, and so forth). The user devices 114 can also include devices that aren't typically considered to be user devices such as a vehicle. A user interacts with all of these devices and/or services and they all have information that can be used by the digital assistant system 102 to provide digital assistant services to the user. This data will be collectively referred to as user data and can include information related to the user as well as information about the user such as preferences, profile information and so forth. Example information includes, but is not limited to, a user's calendar and/or schedule, to do list, email history, purchase history, a user's normal routine, route to work, home location, work location, school location (i.e., for a student), preferred forms of communication, devices owned/interacted with, and so forth.

Another source of information (104) can be information from the internet, third parties, and so forth. This is illustrated as 110 in FIG. 1. This information can be about the user, information utilized by the digital assistant system 102, or any other relevant information. In this context, relevant means information that will be useful in providing services of the digital assistant system 102. By way of example only, such information may include fulfillment information (information useful in fulfilling a service request by a user), information about a user's devices 114, information about the user not available from user devices 114, weather information, information about a user's location (close by business, points of interest, maps, and so forth), and/or other relevant information.

The user devices 114 and/or other sources of information 110 may be connected to the digital assistant system 102 via one or more networks 112. These can be any type of wired or wireless networks in any combination that allows the user devices 114 and the other sources of information 110 to connect to the digital assistant system 102 and/or vice versa.

The user devices 114 can serve not only as information sources, but also as information sinks for the digital assistant system 102. For example, some or all of the services, systems, devices, etc. associated with a user can have functionality to interact with the digital assistant system 102. As representative examples, user devices and/or systems 114 can execute a digital assistant client, web browser, messaging system, or other channel through which a user can interact with the digital assistant system 102 in either a proactive or reactive way. In the context of this disclosure, proactive means that the system takes action based on occurrence of an event, series of events, when a condition or combination of conditions are met, and so forth. Reactive means the system is responding, taking action, and so forth in response to the user reaching out to the digital assistant in some fashion like text, voice, gesture, eye tracking, and so forth.

As an example of a reactive operation for the digital assistant system 102, a user may use a device to ask a question "what is on my schedule today?" and the digital assistant system 102 can respond with a card including the user's scheduled events for the day. The user can ask the question via voice, input via a touch, gesture or text, or any other way. Furthermore, a request and response may use different devices. A user may ask the question, for example, using a client on a mobile device and the digital assistant system 102 can respond by displaying a card on a display in vehicle.

As an example of a proactive mode, the digital assistant system 102 may know the vehicle's location, direction or route of travel, state of charge, and realize that if the user passes the closest charging station by any significant distance, the vehicle will likely not have sufficient charge to make it to the next charging station. In that instance the digital assistant system 102 may select an appropriate channel to use to alert the user to the situation and ask if the user would like directions to the nearest charging station. For example, the digital assistant system 102 may decide to alert the user by initiating an action that mutes the radio, plays an alert sound, displays on a screen within the vehicle that the state of charge may not be sufficient to reach a more distant charging station and ask the user if they would like directions to the nearest charging station. As before, multiple devices can be involved, so if the user is talking on the phone, the alert sound may be played through the phone while the card may still be played on a screen in the vehicle.

The information coming into the digital assistant system 102 may help the digital assistant system 102 decide where and how to provide a card to a user. The digital assistant system 102 can track the various devices and systems as well as the user's current context, such as what the user is currently doing, where the user is doing it, what devices are able to reach the user, and so forth, and based on the card and other factors select a particular channel for reaching the user. The various channels can be matched with the actions the digital assistant system 102 has to transfer and an appropriate channel selected. For example, if a user has a watch, a phone, a laptop and a desk computer as possible channels to reach the user, and the user is in a meeting located in a conference room, the digital assistant system 102 would know that the user may not be likely to receive urgent tips sent to the laptop or desktop, but may be likely to receive tips via the watch or mobile phone. Given the context of the meeting, the digital assistant system 102 may determine that even for urgent tips, something providing an audible alert would not be welcome and thus chose to display text on the watch and vibrate the watch.

Channels can be selected based on rules, such as "if the user is in a meeting, do not send audible information," by probabilities/scores such as "a user is walking and likely to ignore information sent to a phone," or by any combination thereof, such as "a user is walking and is therefore likely to ignore information sent to a phone, thus, the importance of the information dictates that the alert be sent to the watch and that both an audible alert and vibration should be used."

Figure 2:
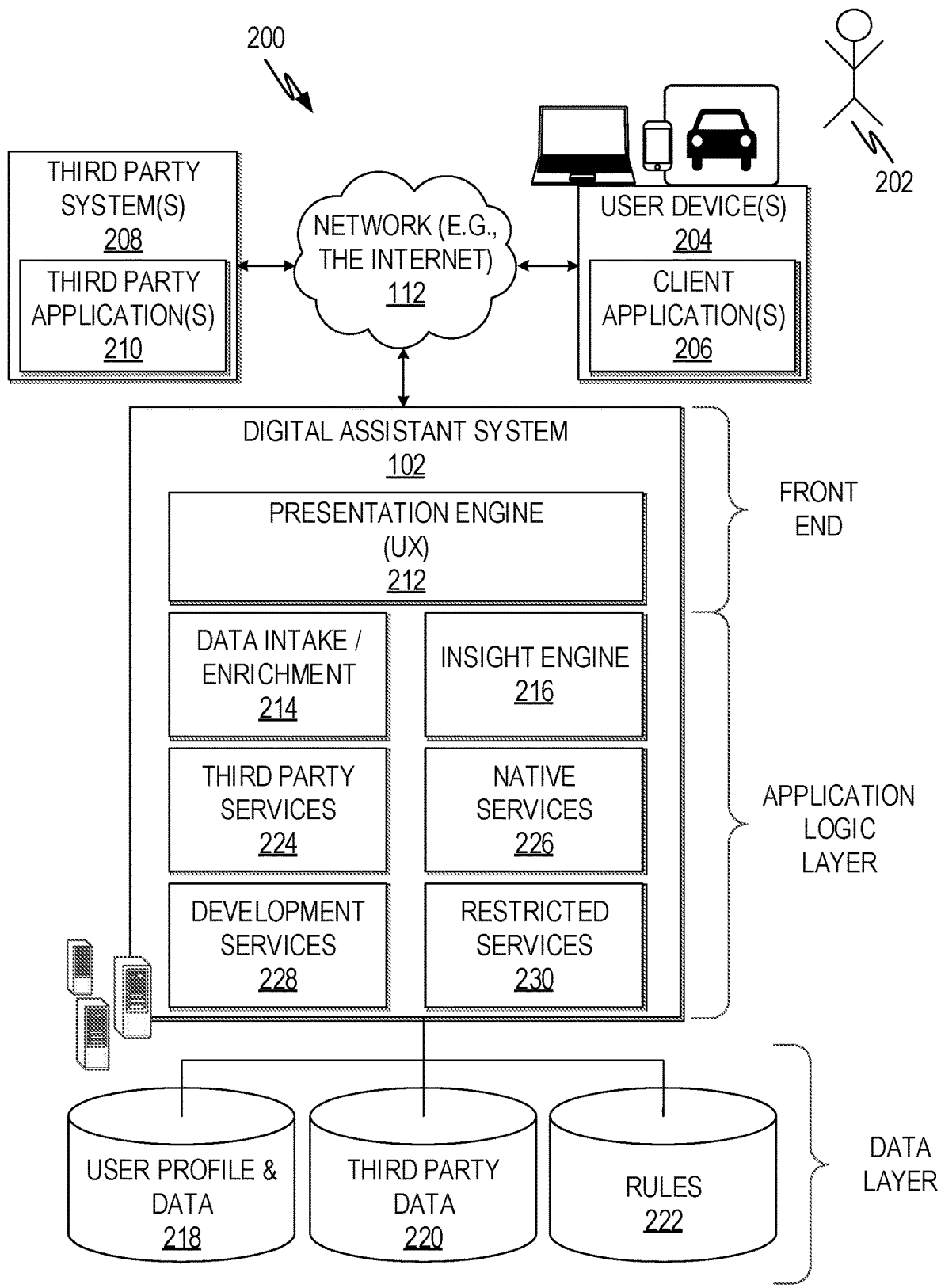
FIG. 2 illustrates an example of a digital assistant architecture.

FIG. 2 illustrates an example of a digital assistant architecture, shown generally as 200. Such an architecture shows one possible embodiment where the various aspects of a digital assistant system, such as digital assistant system 102, can be implemented in a three-tiered architecture, comprising a front-end layer, an application logic layer and a data layer. Such an architecture is only one type of cloud and/or server architecture which would be suitable for the disclosed embodiments and numerous other models and architectures could also be used. However, the three-tiered architecture is sufficient for explanation purposes and those of skill in the art would be able to understand how to implement the digital assistant architecture in other environments from the explanation provided.

As is understood by skilled artisans in the relevant computer and internet-related arts, each module or engine shown in FIG. 2 represents a set of executable software instructions and the corresponding hardware (e.g., memory and processor) for executing the instructions. To avoid obscuring the disclosed subject matter with unnecessary detail, various functional modules and engines that are not germane to conveying an understanding of the disclosed subject matter have been omitted from FIG. 2.

As shown in FIG. 2, the front end layer comprises a presentation engine 212 which can include one or more software and/or hardware implemented modules. The presentation engine is responsible for the user experience (UX) and receives information and/or requests from various client-computing devices including one or more user device(s) 204, and communicates appropriate responses to the requesting device. Thus, the presentation engine 212 can cause presentation of information (e.g., cards, etc.), user interfaces, and so forth on the user devices 204, generally through the client application(s) 206.

In this embodiment, user devices 204 can include various devices such as the wearable, carry-able, stationary/semi-stationary devices, servers, and so forth previously discussed in conjunction with FIG. 1. In addition, one more vehicles can be considered user devices in the context of the embodiment of FIG. 2, even though such vehicle(s) may be associated with different users at different times, such as where a vehicle is shared by more than one user.

The user device(s) 204 may execute different client applications 206 that allow the device to communicate with the digital assistant system 102, typically through the presentation engine 212. Such applications can include, but are not limited to web browser applications, a digital assistant application, and/or client applications (also referred to as "apps") that have been developed for one or more platforms to provide functionality to present information to the user and communicate via the network(s) 112 to exchange information with the digital assistant system 102. Each of the user devices 204 may comprise a computing device that includes at least a display and communication capabilities with the network 112 to access the digital assistant system 102. One or more users 202 may be a person, a machine, or other means of interacting with the user device(s) 204. The user(s) 202 may interact with the digital assistant system 102 via the user device(s) 204. The user(s) 202 may not be part of the networked environment, but may be associated with user device(s) 204.

As shown in FIG. 2, the data layer includes several databases and/or other types of data sores (collectively data stores), including a data store 218 for storing data associated with a user, such as user 202. The types of information that can be stored in such a data store, includes, but is not limited to, any user information discussed above.

The data layer can also include a third party data store, which stores information obtained from third parties, such as from third party system(s) 208 and/or third party application(s) 210. This information can be about the user, or may be information used by service actions to provide the service utilized with the service action. For example, if the service action further utilizes services provided by the third party system(s) 208 and/or third party application(s) 210, information allowing the interoperation between the digital assistant system 102 and the third party system(s) 208 and/or third party application(s) 210 may be stored in third party data store 220. Information gathered from other sources, such as other sources 110 of FIG. 1, may also be stored in third party data store 220 in some embodiments.

Another data store in the data layer can contain rules 222 for the insight engine 216 to operate on. Such rules specify a set (combination) of input data, a set of conditions and a set of resultant action(s). In this context a set can consist of one or more items (i.e., one or more input data, one or more conditions, and/or one or more resultant actions). In other words, a rule defines a relationship between input data and resultant action(s). An example rule might be that when a user is within a threshold time from an appointment, then send a card to the user reminding the user to leave for the appointment. This example rule defines a relationship between user information (the user with the appointment, the appointment), and a resultant action (send a reminder to leave for the appointment). Conditions can be implied, derived, or express, such as when the time within a designated threshold.

The digital assistant system 102 also comprises data intake and/or enrichment modules 214. As data is received, the data can be processed in a variety of ways, including any combination of pre-processing operations such as validation, cleaning, normalization, transformation, feature extraction, selection, and so forth. Validation and/or cleaning generally includes of detecting and correcting data or removing data that is corrupt, inaccurate, incomplete, etc. Validation also ensures that data is of the proper type. Normalization generally includes ensuring data is scaled appropriately, redundancies are removed, and so forth. Transformation includes mapping data from one set to another, such as when data from various sources are mapped to an equivalent data set (i.e., where part numbers from different manufacturers are transformed with a standard part numbering system) and so forth. Feature extraction includes identifying and extracting various pieces of relevant information is sometimes related to machine learning. Feature extraction can also involve reducing the dimensionality of a data set. Selection includes selecting a subset of relevant features that are of interest. Other pre-processing may also be used as appropriate.

The data intake and/or enrichment module 214 may also perform data enrichment. Data enrichment often correlates information from different sources and assembles it in a way that the data becomes enriched with (i.e., related to) other information. For example, user information from multiple sources can be assembled in one or more associated data structures. The assembled information can then allow the digital assistant system to identify where a user is and what activities a user is engaged in.

The data intake and/or enrichment module 214 can receive and assemble information from a variety of source, represented in FIG. 2 by the third party system(s) 208, the third party application(s) 210, the user device(s) 204 and other sources. By way of example only, the third party application(s) 210 and/or the third party system(s) 208 can represent the sources 110 discussed in conjunction with FIG. 1. Additionally, or alternatively, the third party application(s) 210 and/or the third party system(s) 208 can represent services like email, scheduling/calendaring, and other such services. The third party application(s) 210 and/or the third party system(s) 208 can also represent other inference systems like hubs which assemble information and make inferences. These can infer things like home/work/school location and activities, travel context, location and visiting patterns, route patterns, meeting contexts, communication contexts, emergency information, search contexts and so forth. Of course given the raw data, the digital assistant system 102 can also make such inferences in some embodiments.

Third party system(s) 208 and third party application(s) 210 can also represent developer systems which are used by developers to interact with the digital assistant system 102 as described herein.

The digital assistant system 102 also comprises an insight engine 216. The insight engine 216 is responsible for providing various insights into a particular user or set of users. Insights, as used herein, are deductions made by the insight engine about a user or set of users. The list of insights made by insight engine 216 is set by the rules stored in rules store 222 and represent a set of fundamental insights upon which services can be built. Example insights can be representative of a particular context and/or activity of the user such as in a meeting, operating a vehicle, browsing the internet, working, at a store, on vacation, and so forth.

The insight engine 216 monitors the incoming information and acts in accordance with the rules of rules store 222. The insight engine 216 allows the digital assistant system to act in either a proactive manner or in a reactive manner. In the proactive mode the insight engine 216 identifies that the conditions of one or more rules in rules store 222 have been met and sets the insight. The system can then use the set insight(s) to takes the indicated actions. For example, services can "subscribe" to an insight and when triggered, take action in accordance with the insight. Thus, looked at one way, the insight triggers invocation of one or more services of the digital assistant system 102.

The digital assistant system 102 can also act in a reactive mode, such as when a request is received, as previously discussed.

The digital assistant system 102 comprises a plurality of classes of services. Native services 226 are those services provided by the entity responsible for the digital assistant system 102 (i.e., the digital assistant system provider). These are the "built in" services that the digital assistant system 102 provides to users. They can include things like reminding users of appointments, retrieving a user's schedule, suggesting a time to meet, searching for information, and numerous other native services, depending on the nature of the digital assistant system 102.

Another class of services are third-party services 224. These are services that have been added to the digital assistant via deployed service actions as described herein and that are unrestricted in their use (i.e., any user can utilize these services). These services can include any type of service including services that allow the personal digital assistant to provide services in domains not addressed by native services. Such services are sometimes related to fulfillment. Fulfillment in this context means providing a requested service and/or product to a user and includes things like booking travel, ordering a car, reserving a hotel room, ordering services for a user's home, checking on the status of a package, or any other type of fulfillment.

Another class of services are restricted services 230. These are services that have been added to the digital assistant via deployed service actions as described herein and that are restricted to a set of authorized users. In some embodiments, these services also include native services that are restricted to a set of authorized users.

Another class of services are development services 228. The development services 228 are services provided by service actions that are still in development by a developer. Such services are typically restricted to a set of users specified by the developer. Development services run alongside the other classes of services within the digital assistant system 102.

In some embodiments, prior to allowing a restricted service and/or development service to be invoked in either a proactive or reactive manner, the digital assistant system 102 checks to ensure the user associated with either the request or the insight attempting to invoke the service is authorized to invoke the service. This can be accomplished by comparing the respective associated user with the set of authorized users and allowing access if the associated user is in the set of authorized users. Other formulations are also possible, such as keeping a set of non-authorized users and checking to make sure the associated user is not in the non-authorized set or other mechanisms.

Figure 3:
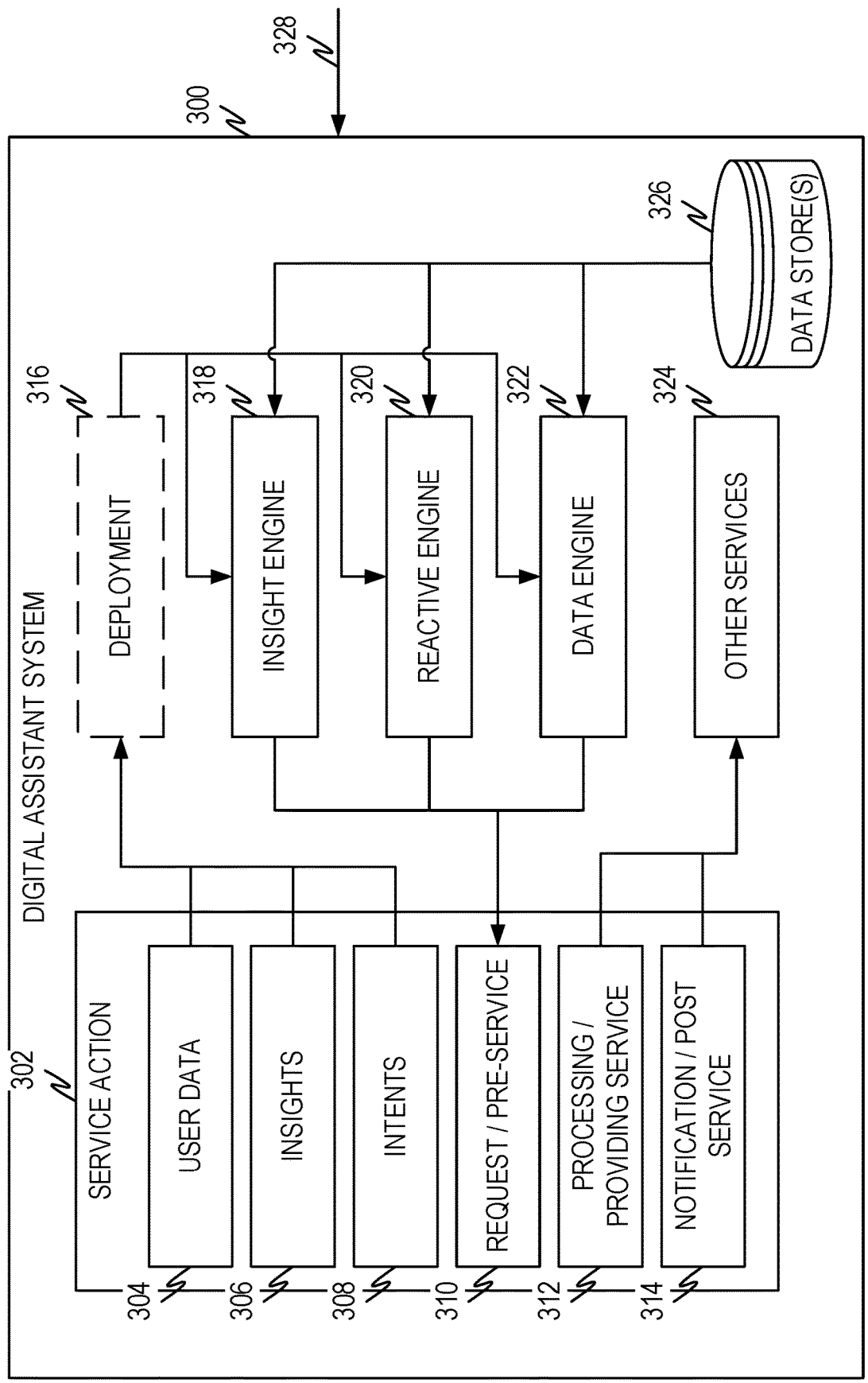
FIG. 3 illustrates another an example of a digital assistant architecture.

FIG. 3 illustrates another an example of a digital assistant architecture 300. This diagram will be used to explain the component parts of a service action 302 and conceptually illustrate how a service action is integrated into a digital assistant system 300. Service actions are created by a developer using a development environment that is designed to integrate with the digital assistant system. The details of the development process are discussed below in conjunction with FIG. 4. When a developer creates a service action 302, a template, SDK, and/or other development environment aspects can be utilized to help the developer.

In creating a service action 302, the developer specifies several major items that are illustrated conceptually in the service action 302. The developer specifies a set of user data 304 that the developer needs and/or wants to receive when the service action is invoked. The user data 304 is that user information needed and/or wanted by the service action to provide the service to a user. For example, in the case of a service action that lets a user order take out or delivery food, the service may need information about the user such as their current location, their dining preferences (menu, preferred restaurants, and so forth), and so forth. There may also be optional information the service action would prefer to have, but if it isn't available, the service action can still make assumptions or use default values. Thus the user data 304 represents that set of data that the service action either needs and/or would prefer to have if it is available.

Not all of the information known by the digital assistant is exposed/passed on to the third party. In some embodiments, the user is able to control what information is passed to the service. For example, an airline reservation system may ask the digital assistant to provide information regarding passport, name, address, seat preference, meal preference, and so forth. However, the user may not be comfortable providing passport information and may have configured a profile, etc. to restrict access to that information.

A rich set of controls may be provided to a user to control access to information known by the digital assistant. For example, information may be restricted by default, provided by default, and so forth. Additionally, or alternatively, a user may be able to allow access or restrict access (by default or otherwise) by service provider, class of service, type of information, purpose to which the information is put, or based on various conditions like time, location (of the service provider or of the user or both), and so forth. In this way, fine grained control may be provided to a user to effectuate the desires of the user.

If a user is allowed to restrict access to information it is possible that the digital assistant (in conjunction with service providers) will be unable to accomplish the requested task. In such a situation, the developer can simply refuse to provide the service if insufficient information is provided. For example, if a user is unwilling to provide a location where a pizza is to be delivered, a pizza delivery service may decline to provide service. If a user has configured a profile that precludes the digital assistant from providing a required piece of information (such as where a pizza is to be delivered), the digital assistant, service provider, and so forth can reach out to the user to gain authorization to disclose the required information, gather the required information from the user (i.e., present a UI requesting the information, etc.) in order to complete the requested task. If a user still declines to provide the information, the digital assistant, service provider, etc. can inform the user that the requested task cannot be performed.

As previously discussed, insights produced by an insight engine 318 can be used to trigger invocation of the service action 302 in a proactive manner. As an example, if the insight engine 318 produces the insight that the user is going on vacation, and a service action provides hotel booking services, the insight of a scheduled vacation can be used to trigger invocation of the service action. Thus, the insights 306 of the service action 302 represent those insights a developer uses to trigger invocation of the service action 302 in a proactive manner. These insights are identified by the developer at development time. When the insight engine 318 detects occurrence of the subscribed insights 306, the digital assistant system 300 can invoke the service action 302 and/or present a card to the user that includes the option to invoke the service action 302.

Finally, as the digital assistant system 300 receives requests from users, the requests can be used to trigger invocation of the service action 302. Conceptually, the processing of requests is illustrated as the reactive engine 320. A developer can specify a set of intents 308 that are used by the digital assistant system 300 to trigger invocation of the service action 302. In one embodiment, the set of intents represent at least a portion of a request 328 that may come into the digital assistant system 302 from a user. For example, if the service action 302 provides an appointment scheduling service, the developer may want the service to be triggered when the request 328 includes "schedule" and "appointment" in some designated proximity to each other or simply within the same request. When the reactive engine 320 detects occurrence of the appropriate intent 308, the digital assistant system 300 can invoke the service action 302 and/or present a card to the user that includes the option to invoke the service action 302. In this context intent can be indicated by occurrence of one or more trigger phrases, inferred from the context (actions, environment, location, etc.) of the user, inferred from other available information, and so forth. Intent is simply meant to convey that the system is able to identify what the user desires to occur.

The developer also implements methods that actually perform the service provided by the service action. Conceptually, these methods can be broken into three categories. The first category contains one or more methods that are invoked when the digital assistant system 300 first detects occurrence of a subscribed insight (in proactive operation) or first detects the occurrence of a subscribed intent (in reactive operation). These methods are illustrated as the request/pre-service methods 310 of the service action 304. The developer can use these methods to perform any desired functions that should occur before the actual service processing occurs. Some examples may be checking to ensure the required data is available or has been provided, prompting the user for additional required information, checking availability of required services, and so forth.

The second category of methods contains one or more methods that actually provide the particular service. These are illustrated by the processing/providing service methods 312 of the service action 302. The methods in this category are invoked after the request/pre-processing methods 310 and provide any functionality needed to provide the actual service. This can include relying on services that are part of the digital assistant system 300 as illustrated by the connection to the other services 324. In addition, in some embodiments, the processing/providing service methods 312 can rely on services provided outside the digital assistant system such as some third party application and/or system like third party system(s) 208 and/or third party application(s) 210 of FIG. 2. For example, if a service action provider has existing systems and/or services that are used to provide the service of the service action 302, the processing/providing service methods 312 can utilize those existing systems and/or services. Additionally, or alternatively, these methods can transfer information to the service provider through the digital assistant system and infrastructure itself (not necessarily on or through third party systems).

As a representative example, suppose a user has requested an airline system book a flight from Seattle to San Francisco. The airline system may receive the starting and ending destinations from the digital assistant system (i.e., Seattle and San Francisco, respectively). However, to book the flight the starting and ending destinations need to be converted to the respective airport codes. Thus, the airline system may use custom code to call into a system that converts Seattle to SEA and San Francisco to SFO (the respective airport codes). These airport codes may then be passed to another system to obtain the flight availability. The flight availability may then be compared to the desires of the user (i.e., to book a flight after a particular time on a particular day) in order to identify likely candidates that may then be filtered further based on other criteria provided by the digital assistant, such as price, airline frequent flier program preference, seat preference, and so forth. Further systems may then be engaged to pay for the flight, place the flight on the user's calendar, place the boarding pass on a user's phone, or whatever else is provided as part of the service.

The final category of methods contains one or more methods that are invoked after the processing/providing service methods 312. These are illustrated by the notification/post service methods 314 of the service action 302. These methods can be used, for example, to provide information back to the user as needed and to take care of any other items that are needed to clean up after the methods that provide the service (312). As a representative example, the notification/post service methods 314 can be used to provide an indication of success to the user that the service action has accomplished the requested service or provide a status update on completion of the service.

Deployment of the service action 302 is usually accomplished by a management fabric associated with the digital assistant system. A fabric generally refers to all of the physical and virtual resources under the scope of management of the fabric management infrastructure. Thus, a management fabric for the digital assistant system 300 can generally accomplish things like deploying the various services and/or micro-services that make up the digital assistant 300, coordinate management of these various parts, collect metrics/diagnostic information, and so forth. Once deployed, the services and/or micro-services that make up the digital assistant 300 coordinate to accomplish the functions of the digital assistant 300. When the service action 302 is deployed (typically by a management fabric), the service action 302 becomes part of the digital assistant system 300 and functions in conjunction with the other services and/or micro-services of the digital assistant system 300. This requires the services and/or micro-services of the digital assistant system 300 to know about and integrate with the service action 302.

Conceptually, this deployment and integration is illustrated by the dashed deployment box 316. The deployment box 316 is illustrated in dashed representation to indicate that this function is not provided by the digital assistant system 300 itself in some embodiments, but is a function that is performed by other entities to effectuate the desired integration. Thus the deployment box 316 is illustrated as ensuring that the service action 302 is integrated into the insight engine 316, which conceptually provides the subscribed insights 306 to the service action 302, the reactive engine 320, which conceptually provides indication the intent 308 in a request, and the data engine 322, which conceptually provides the requested user data 304 to the service action 302 upon invocation.

Data store 326 of the digital assistant system 300 represents any data stores needed to store and retrieve the appropriate information for operation of the digital assistant system 300.

Figure 4:
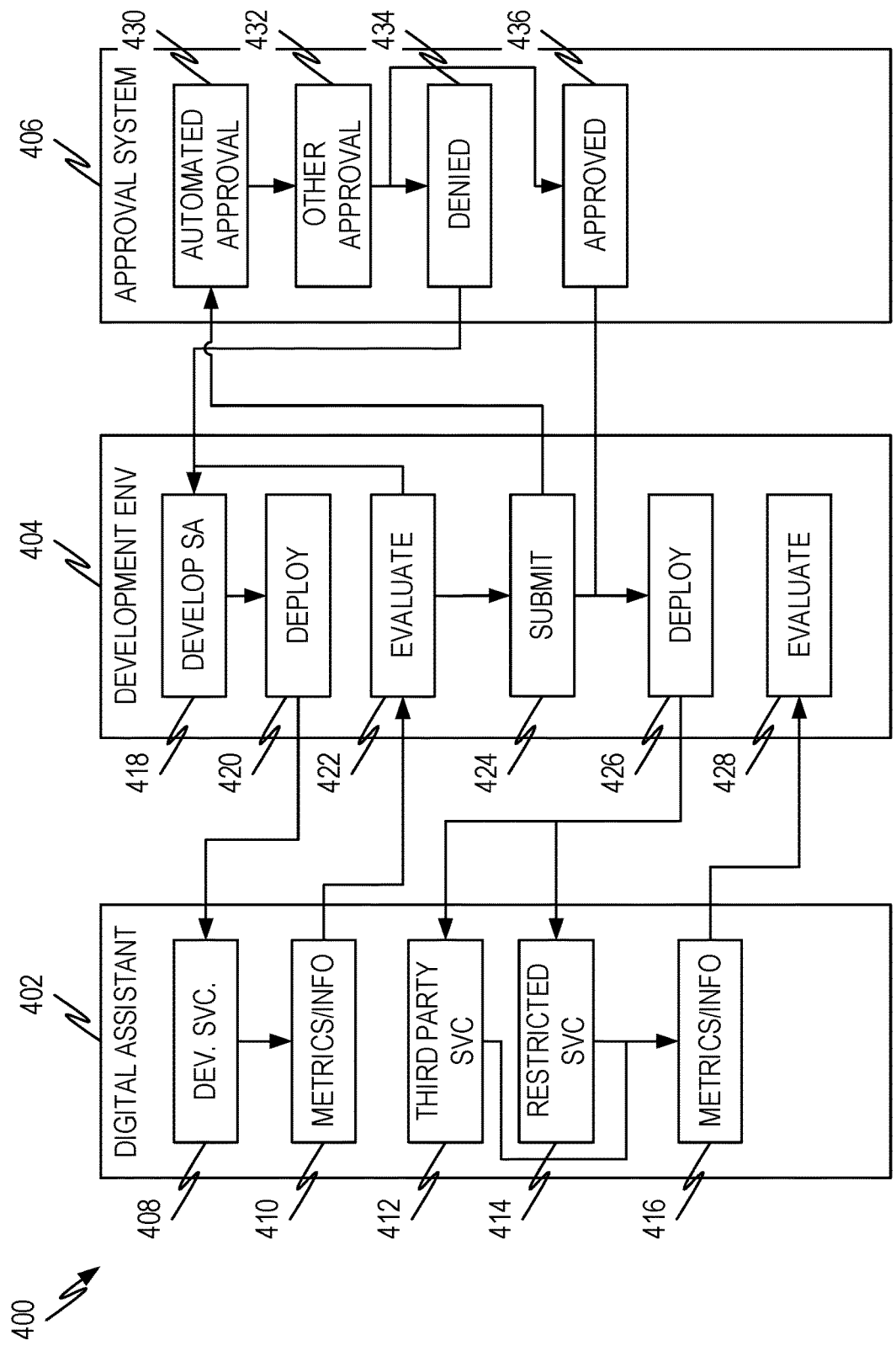
FIG. 4 illustrates an example flow diagram and interactions between the various aspects of a digital assistant architecture for development and deployment of service actions.

FIG. 4 illustrates an example flow diagram and interactions between the various aspects of a digital assistant architecture for development and deployment of service actions. The flow diagram illustrates the interactions between the development environment 404 and the digital assistant system 402 and the approval system 406 during the development process.

A developer uses the development environment 404 to develop a service action as indicated in operation 418. As discussed above, the development environment can provide templates, software development kits (SDK), and other helps to pre-populate a service action template with the appropriate infrastructure and plumbing to allow the service action being developed to integrate with the digital assistant system 402. The template allows the developer to create the various aspects of the service action as illustrated in conjunction with service action 302. Thus, the service action template will allow the developer to specify the user data 304 desired and/or required by the service action, the insights 306 the service action should be subscribed to, the intent 308 in a request that should be used to invoke the service action, the pre-service methods 310, the service methods 312 and the post service methods 314.

Once the developer finishes creating the service action, the service action is deployed to the digital assistant as indicated by operation 420. Service actions in development are deployed as developer services as indicated by operation 408. Deployment is accomplished through a single or a few commands issued by the development environment. These commands will register the service action to the developer so that it will show up in the developer's portal, dashboard, management console, etc. and can interface with the management fabric or other mechanism(s) that will ensure proper deployment of the service action.

Deployment of the service action as a developer service typically allows the developer to specify a set of users that should be allowed to access the service action. This concept has been discussed above in conjunction with the restricted and developer services of FIG. 2.

Once deployed, the service action begins showing up as an option for the authorized users. In other words, the user experience is that if a user is authorized to use a particular service action (deployed as a developer service or as a restricted service discussed below), the user will be able to use the digital assistant system 402 not only to accomplish other native and authorized services, but also the authorized developer service provided by the deployed service action. This creates a unique user experience where services in development run side-by-side with production services with no difference between them as far as the user is concerned. This provides a very different experience than the traditional development methods where separate test systems or separate test environments are used to test something in development before it is deployed to the production environment. Thus, even if the developer services provided by the deployed service actions are physically run on a different system or cloud infrastructure, the end user experience is that the developer services are integrated with, and run side-by-side with, other production services.

Owners of a service action, including developers, can be provided with data regarding operation of their service through a portal, dashboard, management console or other mechanism. Thus, the digital assistant collects metrics and information regarding deployed service actions, including those deployed as developer services as indicated in operation 410. This information can include such information as logging information for debug or other purposes. The information can also include metrics on how many resources the service used such as CPU power (i.e., a measure not just of CPU time, but of the 'quality' of CPU used, such as taking into account the speed of operation of the CPU, the type of CPU, and so forth), network bandwidth, and so forth. Additionally, or alternatively, the metrics can include the number of transactions performed (i.e., individual transactions performed by users/service provider and/or times the service was invoked, etc.). The metrics can also include information on how many users have utilized the service, how they utilized the service, or any other metrics that a developer can use to evaluate the utilization and operation of the deployed service action. This evaluation is illustrated as operation 422.

Based on the evaluation 422, the developer may make changes or may decide the service is ready to be deployed in a 'production' sense. In the former instance, operation 418 represents further changes and the beginning of another deployment/testing round. In the latter instance, the developer can submit the service action (operation 424) for any required approval process. If approval is not required, the service action may simply be deployed (operation 426).

Many approval processes rely on automated code checks, manual checks, and/or some combination thereof. In FIG. 4, operation 424 shows the service action being submitted to an approval system 406 for approval. In this context approval system 406 can be a physical system or can represent a process that utilizes one or more systems. The illustrated approval process begins in operation 430 where any automated code checks are performed. If that is all that is required, the process may then simply approve (436) or deny (434) approval based on the output of the code checks.

If further approval is required, operation 432 represents such further approval. This can represent either further automated checks or manual checks or any combination thereof. In some embodiments, operation 432 is only performed if a service action passes the automated approval operation 430.

Once any required approval process is performed and the service action is either accepted 434 or denied 436, the developer can make further changes (operation 418) or can deploy the service action (426) in accordance with the approval decision.

Some embodiments of a digital assistant 402 can restrict access to a particular service to a designated set of authorized users. This has been discussed previously in conjunction with restricted services 230. The same mechanism that allows a digital assistant system 402 to deploy developer services side-by-side with production services can be used to restrict production deployed services to a group of authorized users. Thus, some embodiments of a digital assistant 402 can utilize this functionality to offer restricted services. In these embodiments, when a service action is deployed, the developer can opt to deploy the service either as an unrestricted service (third party service 412) or as a restricted service (restricted service 414). The difference is that for restricted services, before invocation the user associated with a request or insight will be checked to ensure the user is authorized to use the service.

Metrics on production deployed services can also be gathered as indicated by operation 416 and provided to the service owner via portal, dashboard, management console, and so forth (operation 428). The portal, dashboard, management console, etc. used to provide the metrics and other information will also allow the service owner to manage the deployed services and can provide such functionality as pulling the service from the production environment, starting/stopping a service, replacing a service with an updated/new version, and any other management tasks. The metrics can be some or all of the metrics discussed above in conjunction with developer services.

Figure 5:
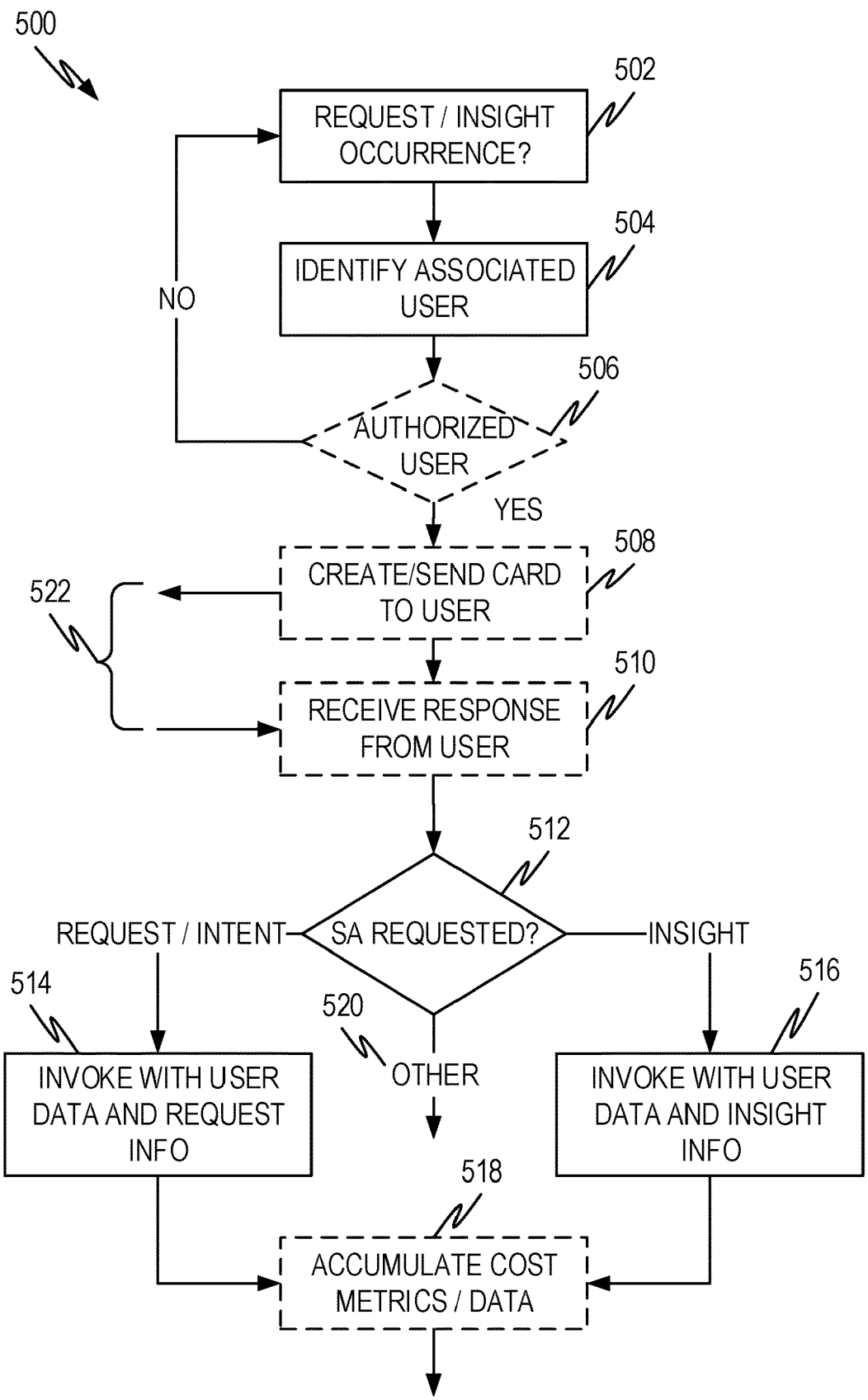
FIG. 5 illustrates an example flow diagram for invocation of a service action.

FIG. 5 illustrates an example flow diagram 500 for invocation of a service action. This flow diagram would be implemented, for example, by a digital assistant system, such as those previously discussed above when invoking the service actions integrated into the digital assistant system.

In operation 502 the system receives a request or the digital assistant system identifies the occurrence of an insight. Upon either of these occurrences, the system identifies the user associated with the request and/or insight occurrence. For requests, this can be accomplished by looking at the information associated with the request (i.e., the source of the request). Requests have an associated user device or other source that is the origin of the request. User devices and sources are associated with a user through a user account. In other words, a user device is associated with a particular user account. A user account is "owned" or associated with a user. In a typical implementation, services are restricted to a particular set of accounts, and hence, a particular set of users. In this disclosure it does not matter whether access to services is tied to a particular user or to a particular account as both are related to each other. Thus, for simplicity the disclosure talks about authorized set of users, identifying a user associated with a request, and so forth. However, implementations could just as easily be based on accounts and an authorized set of accounts and identifying an account associated with a request, and so forth. Therefore, in this disclosure user and account will both be referred to as "user" and the term encompasses both a user and/or an account for authorization and such purposes.

Just as a request has a user device/source that allows the system to identify the user associated with the device, insights are tied to particular users through the data that triggers the insight. In other words, insights are directly tied to a user since data associated with a particular user triggers the insight. As an example, an insight might be "in a meeting" which is identified by the system (e.g., by an insight engine) through evaluating a user's calendar or schedule through one or more rules such as "if a user's calendar shows she is in a meeting, then set the 'in a meeting' insight" or "if a user's calendar shows she is in a meeting and the present location of the user matches the location of the meeting, then set the 'in a meeting' insight". The resultant insight is thus set for a particular user and is directly tied to that user through the data evaluated to set the insight.

Once the user (or account) has been identified, the system may optionally test to ensure whether the user is authorized to access the service action associated with the request and/or insight. This is illustrated in FIG. 5 by optional authorization test operation 506. Methods to determine whether a user is authorized have been previously discussed and include, but are not limited to, identifying whether a user is a member of a group of authorized users, identifying whether a user is not a member of a group of excluded users, and so forth.

Users that are not authorized will not invoke protected services (i.e., developer and/or restricted services) as indicated by the 'no' branch out of authorized user test operation 506. If the system determines the user is authorized, or if the system does not check to see whether a user is authorized (i.e., the service is not protected), the system can optionally send a card to the user (operation 508) and receive a response from a user (operation 510). In some embodiments and/or in some situations, user input 522 is needed before the service action is invoked. As an example, a request and/or insight may trigger a card designed to narrow down the specific desire of a user from among multiple options. A representative example could be where the user says "make me a hotel reservation for my trip to Malta." In this representative example, if the service action makes hotel reservations on behalf of a user, the service action may need to identify which hotel to make a reservation for. So the card may present a list of possible hotels along with information like location, cost, ratings, and so forth and ask for clarification as to the hotel desired. In an alternative example, if the digital assistant has multiple service actions that can make hotel reservations, the card may request the user identify which service action the reservation should be made through.

In other embodiments or situations, no further user input 522 is needed and the digital assistant system simply identifies whether a service action (as opposed to a native service) should be invoked in operation 512. If the associated service action is to be invoked (request and/or insight branches out of operation 512), the digital assistant system invokes the service activity either using the information provided in the request along with the appropriate user data in operation 514 or using the information in the insight along with the appropriate user data in operation 516. The service action can be invoked, for example, by invoking the preprocessing methods discussed previously. If the digital assistant system does not invoke the service action, it can still invoke a native service or perform some other processing as indicated by other branch 520.

When the service action is invoked, the digital assistant system can perform other functions represented in operation 518 such as gathering metrics discussed above, accumulating costs, and other activities. In some embodiments some or all of the functions of metric/data gathering, logging, cost accumulation (or collecting raw data from which costs can be assembled) can be performed by entities outside the digital assistant, for example a management or other fabric. However, operation 518 is shown in this diagram to illustrate that cost accumulation, metric and/or data gathering, etc. is performed for service actions that are invoked by the digital assistant system.

Example Machine Architecture and Machine-Readable Medium

Figure 6:
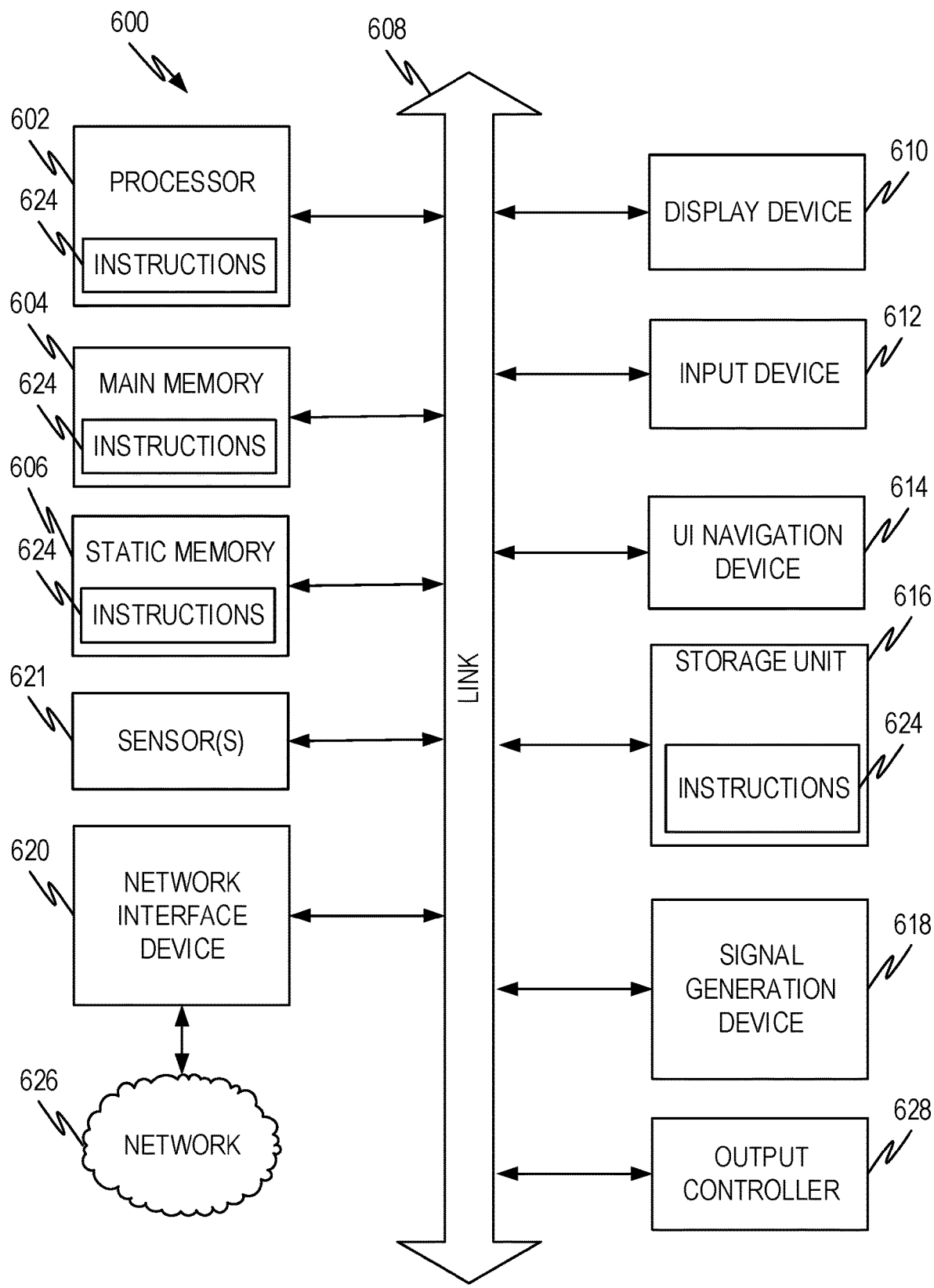
FIG. 6 illustrates a representative architecture of a machine suitable for implementing the digital assistant, user devices, etc. or executing the methods disclosed herein.

FIG. 6 illustrates a representative architecture of a machine suitable for implementing the digital assistant, user devices, etc. or executing the methods disclosed herein. The machine of FIG. 6 is shown as a standalone device, which is suitable for implementation of the concepts above. For the server aspects described above a plurality of such machines operating in a data center and providing one or more of the cloud architectures disclosed above is most often used. For user device aspects described above, only certain of the functions will be utilized. Thus a wearable may have a screen, a touch screen input, while a portable or semiportable may not have a touch screen input. Therefore, the architecture below should be taken as encompassing multiple types of devices and machines and various aspects may or may not exist in any particular device or machine depending on its form factor and purpose (for example, servers rarely have cameras, while wearables rarely comprise magnetic disks). However, the example explanation of FIG. 6 is suitable to allow those of skill in the art to determine how to implement the embodiments previously described with an appropriate combination of hardware and software. In accordance with this, wearable, carry-able, portable or semiportable, server, cloud, and other architectures may have different combinations of the features outlined below.

While only a single machine is illustrated, the term "machine" shall also be taken to include any collection of machines that individually or jointly execute a set (or multiple sets) of instructions to perform any one or more of the methodologies discussed herein.

The example of the machine 600 includes at least one processor 602 (e.g., a central processing unit (CPU), a graphics processing unit (GPU), advanced processing unit (APU), or combinations thereof), one or more memories such as a main memory 604, a static memory 606, or other types of memory, which communicate with each other via link 608. Link 608 may be a bus or other type of connection channel. The machine 600 may include further optional aspects such as a graphics display unit 610 comprising any type of display. The machine 600 may also include other optional aspects such as an alphanumeric input device 612 (e.g., a keyboard, touch screen, and so forth), a user interface (UI) navigation device 614 (e.g., a mouse, trackball, touch device, and so forth), a storage unit 616 (e.g., disk drive or other storage device(s)), a signal generation device 618 (e.g., a speaker), sensor(s) 621 (e.g., global positioning sensor, accelerometer(s), microphone(s), camera(s), and so forth), output controller 628 (e.g., wired or wireless connection to connect and/or communicate with one or more other devices such as a universal serial bus (USB), near field communication (NFC), infrared (IR), serial/parallel bus, etc.), and a network interface device 620 (e.g., wired and/or wireless).

Executable Instructions and Machine-Readable Medium

The various memories (i.e., 604, 606, and/or memory of the processor(s) 602) and/or storage unit 616 may store one or more sets of instructions and data structures (e.g., software) 624 embodying or utilized by any one or more of the methodologies or functions described herein. These instructions, when executed by processor(s) 602 cause various operations to implement the disclosed embodiments.

As used herein, the terms "machine-readable medium" and "computer-readable medium" mean the same thing and may be used interchangeably in this disclosure. The terms include a single medium or multiple media (e.g., a centralized or distributed database, and/or associated caches and servers) that store the one or more instructions or data structures. The terms shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The terms shall accordingly be taken to include, but not be limited to, solid-state memories, and optical and magnetic media. Specific examples of machine-readable media/computer-readable media include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks. The terms specifically exclude non-statutory signals per se, which are covered under the term "transmission medium" discussed below.

Signal Medium

The term "signal medium" shall be taken to include any form of modulated data signal and signals per se. The term "modulated data signal" means a signal that has one or more of its characteristics set or changed in such a matter as to encode information in the signal.

EXAMPLE EMBODIMENTS

Example 1

A method for extending services offered by a digital assistant comprising:
receiving a service activity comprising:
designation of a set of user data to be provided to the service activity upon invocation;
designation of at least one insight provided by the digital assistant used to invoke the service activity;
designation of at least one intent used to invoke the service activity; and
executable code executed upon invocation of the service activity;
deploy the service activity as a service of the digital assistant;
responsive to occurrence of the designated at least one insight, invoking the service activity and providing to the invoked service activity:
the set of user data; and
the at least one insight;
responsive to receiving a request containing the designated at least one intent, invoking the service activity and providing to the invoked service activity:
the set of user data; and
the request.

Example 2

The method of Example 1, further comprising prior to invoking the service activity:
identifying a user associated with either the designated at least one insight or the at least one intent;
comparing the user to a set of authorized users; and
responsive to the user being in the set of authorized users, invoking the service activity; and
responsive to the user not being in the set of authorized users, not invoking the service activity.

Example 3

The method of Examples 1 or 2 further comprising:
identifying a service provider associated with the service activity; and
assessing a cost to the service provider upon invocation of the service activity.

Example 4

The method of Example 3 wherein the cost is based on resources utilized during execution of the service activity.

Example 5

The method of Example 3, wherein the cost is based on a number of transactions performed through invocation of the service activity.

Example 6

The method of Examples 1, 2 or 3 wherein the service activity is deployed as a development service with access restricted to a designated set of users.

Example 7

The method of Examples 1, 2 or 3 further comprising:
providing the service action as an option to a user in response to the request; and
wherein invocation of the service action is further based upon user input in response to the option.

Example 8

The method of Examples 1, 2 or 3 further comprising:
providing the service action as an option to a user in response to occurrence of the designated at least one insight; and
wherein invocation of the service action is further based upon user input in response to the option.

Example 9

A computing system implementing a digital assistant comprising:
a processor and executable instructions accessible on a machine-readable medium that, when executed, cause the system to perform operations comprising:
receive a service activity comprising:
designation of a set of user data to be provided to the service activity upon invocation;
designation of at least one insight provided by the digital assistant used to invoke the service activity;
designation of at least one insight used to invoke the service activity; and
executable code executed upon invocation of the service activity;
deploy the service activity as a service of the digital assistant;
responsive to occurrence of the designated at least one insight performing operations comprising:
identify a user associated with the at least one insight;
determine where the user associated with the at least one insight is authorized to utilize the service activity;
responsive to determining the user associated with the at least one insight is authorized to utilize the service activity, invoke the service activity and provide the set of user data and the at least one insight to the invoked service activity;
  responsive to occurrence of the designated at least one intent, performing operations comprising:
    identify a user associated with the at least one intent;
    determine where the user associated with the at least one intent is authorized to utilize the service activity;
    responsive to determining the user associated with the at least one intent is authorized to utilize the service activity, invoke the service activity and provide the set of user data and the at least one intent to the invoked service activity.

Example 10

The system of Example 9, wherein the operations further comprise:
  identify a service provider associated with the service activity; and
  assess a cost to the service provider upon invocation of the service activity.

Example 11

The system of Example 10, wherein the cost is based on resources utilized during execution of the service activity.

Example 12

The system of Example 10, wherein the cost is based on transactions performed during execution of the service activity.

Example 13

The system of Examples 9, 10, 11 or 12 wherein the service activity is deployed as a development service with access restricted to a designated set of users.

Example 14

The system of Examples 9, 10, 11 or 12 wherein determining whether the user associated with the at least one insight or the user associated with the at least one intent is authorized comprises comparing the user associated with the at least one insight or the user associated with the at least one intent, respectively, to a set of authorized users.

Example 15

A machine-readable medium having executable instructions encoded thereon, which, when executed by at least one processor of a machine, cause the machine to perform operations comprising:
  receiving a service activity comprising:
    designation of a set of user data to be provided to the service activity upon invocation;
    designation of at least one insight provided by the digital assistant used to invoke the service activity;
    designation of at least one intent used to invoke the service activity; and
    executable code executed upon invocation of the service activity;
  identifying a set of authorized users allowed to utilize the service activity;
  deploy the service activity as a service of the digital assistant;
  responsive to occurrence of the designated at least one insight:
    identifying a user associated with the least one insight;
    comparing the user associated with the at least one insight to the set of authorized users;
    responsive to the user associated with the at least one insight being in the set of authorized users, invoking the service activity and providing the set of user data and the at least one insight to the service activity;
  responsive to occurrence of the at least one intent:
    identifying a user associated with the at least one intent;
    comparing the user associated with the at least one intent to the set of authorized users;
    responsive to the user associated with the at least one intent being in the set of authorized users, invoking the service activity and providing the set of user data and the at least one intent to the service activity.

Example 16

A method for extending services offered by a digital assistant comprising:
  receiving a service activity comprising:
    designation of a set of user data to be provided to the service activity upon invocation;
    designation of at least one insight provided by the digital assistant used to invoke the service activity;
    designation of at least one intent used to invoke the service activity; and
    executable code executed upon invocation of the service activity;
  deploy the service activity as a service of the digital assistant;
  responsive to occurrence of the designated at least one insight, invoking the service activity and providing to the invoked service activity:
    the set of user data; and
    the at least one insight;
  responsive to receiving a request containing the designated at least one intent, invoking the service activity and providing to the invoked service activity:
    the set of user data; and
    the request.

Example 17

The method of Example 16, further comprising prior to invoking the service activity:
  identifying a user associated with either the designated at least one insight or the request;
  comparing the user to a set of authorized users; and
  responsive to the user being in the set of authorized users, invoking the service activity; and
  responsive to the user not being in the set of authorized users, not invoking the service activity.

Example 18

The method of Examples 16 or 17 further comprising:
  identifying a service provider associated with the service activity; and assessing a cost to the service provider upon invocation of the service activity.

Example 19

The method of Example 18 wherein the cost is based on resources utilized during execution of the service activity.

Example 20

The method of Example 18, wherein the cost is based on a number of transactions performed through invocation of the service activity.

Example 21

The method of Examples 16, 17, 18, 19 or 20 wherein the service activity is deployed as a development service with access restricted to a designated set of users.

Example 22

The method of Examples 16, 17, 18, 19, 20 or 21 further comprising:
providing the service action as an option to a user in response to the request; and
wherein invocation of the service action is further based upon user input in response to the option.

Example 23

The method of any preceding Example further comprising:
providing the service action as an option to a user in response to occurrence of the designated at least one insight; and
wherein invocation of the service action is further based upon user input in response to the option.

Example 24

A computing system implementing a digital assistant comprising:
a processor and executable instructions accessible on a machine-readable medium that, when executed, cause the system to perform operations comprising:
receive a service activity comprising:
designation of a set of user data to be provided to the service activity upon invocation;
designation of at least one insight provided by the digital assistant used to invoke the service activity;
designation of at least one intent used to invoke the service activity; and
executable code executed upon invocation of the service activity;
deploy the service activity as a service of the digital assistant;
responsive to occurrence of the designated at least one insight performing operations comprising:
identify a user associated with the at least one insight;
determine where the user associated with the at least one insight is authorized to utilize the service activity;
responsive to determining the user associated with the at least one insight is authorized to utilize the service activity, invoke the service activity and provide the set of user data and the at least one insight to the invoked service activity;
responsive to occurrence of the at least one intent, performing operations comprising:
identify a user associated with the at least one intent;
determine where the user associated with the at least one intent is authorized to utilize the service activity;
responsive to determining the user associated with the at least one intent is authorized to utilize the service activity, invoke the service activity and provide the set of user data and the at least one intent to the invoked service activity.

Example 25

The system of Example 24, wherein the operations further comprise:
identify a service provider associated with the service activity; and
assess a cost to the service provider upon invocation of the service activity.

Example 26

The system of Example 25, wherein the cost is based on resources utilized during execution of the service activity.

Example 27

The system of Example 25, wherein the cost is based on transactions performed during execution of the service activity.

Example 28

The system of Examples 24, 25, 26 or 27 wherein the service activity is deployed as a development service with access restricted to a designated set of users.

Example 29

The system of Examples 24, 25, 26, 27 or 28 wherein determining whether the user associated with the at least one insight or the user associated with the at least one intent are authorized comprises comparing the user associated with the at least one insight or the user associated with the at least one intent, respectively, to a set of authorized users.

Example 30

A machine-readable medium having executable instructions encoded thereon, which, when executed by at least one processor of a machine, cause the machine to perform operations comprising:
receiving a service activity comprising:
designation of a set of user data to be provided to the service activity upon invocation;
designation of at least one insight provided by the digital assistant used to invoke the service activity;
designation of at least one intent used to invoke the service activity; and
executable code executed upon invocation of the service activity;
identifying a set of authorized users allowed to utilize the service activity;
deploy the service activity as a service of the digital assistant;
responsive to occurrence of the designated at least one insight:
identifying a user associated with the least one insight;

comparing the user associated with the at least one insight to the set of authorized users;
responsive to the user associated with the at least one insight being in the set of authorized users, invoking the service activity and providing the set of user data and the at least one insight to the service activity;
responsive to occurrence of the at least one intent:
identifying a user associated with the at least one intent;
comparing the user associated with the at least one intent to the set of authorized users;
responsive to the user associated with the at least one intent being in the set of authorized users, invoking the service activity and providing the set of user data and the at least one intent to the service activity.

CONCLUSION

In view of the many possible embodiments to which the principles of the present invention and the forgoing examples may be applied, it should be recognized that the examples described herein are meant to be illustrative only and should not be taken as limiting the scope of the present invention. Therefore, the invention as described herein contemplates all such embodiments as may come within the scope of the following claims and any equivalents thereto.

What is claimed is:

1. A method for extending services offered by a digital assistant comprising:
   receiving from a third party a service activity not native to the digital assistant, the service activity comprising:
     designation of a set of user data to be provided to the service activity upon invocation;
     designation of at least one insight provided by the digital assistant used to invoke the service activity;
     designation of request information used to invoke the service activity; and
     executable code executed upon invocation of the service activity;
   deploying, via a deployment service, the service activity as a service of the digital assistant thereby extending services offered by the digital assistant to include the service activity, wherein access to the service activity is restricted to a designated set of authorized users;
   responsive to occurrence of the designated at least one insight, invoking the service activity and providing to the invoked service activity:
     the set of user data; and
     the at least one insight;
   responsive to receiving a request containing the designated request information, invoking the service activity and providing to the invoked service activity:
     the set of user data; and
     the request.

2. The method of claim 1, further comprising prior to invoking the service activity:
   identifying a user associated with either the designated at least one insight or the request information;
   comparing the user to a set of authorized users;
   responsive to the user being in the set of authorized users, invoking the service activity; and
   responsive to the user not being in the set of authorized users, not invoking the service.

3. The method of claim 1 further comprising:
   identifying a service provider associated with the service activity; and
   assessing a cost to the service provider upon invocation of the service activity.

4. The method of claim 3 wherein the cost is based on resources utilized during execution of the service activity.

5. The method of claim 3, wherein the cost is based on a number of transactions performed through invocation of the service activity.

6. The method of claim 1, further comprising: providing the service activity as an option to a user in response to the request or occurrence of the designated at least one insight; and
   wherein invocation of the service activity is further based upon user input in response to the option.

7. The method of claim 1, further comprising:
   responsive to occurrence of the designated at least one insight or responsive to receiving the request containing the designated request information:
     performing a check to determine whether all data designated in the set of user data is available;
     responsive to determining that all data designated in the set of user data is available, invoking the service activity;
     responsive to determining that all data designated in the set of user data is not available:
       requesting the user provide any missing data;
       responsive to receiving the missing data, invoking the service activity;
     and responsive to receiving an indication that the user declines to provide the
       missing data, refusing to invoke the service activity.

8. A machine-readable medium having executable instructions encoded thereon, which, when executed by at least one processor of a machine, cause the machine to perform operations comprising:
   receive a service activity comprising:
     designation of a set of user data to be provided to the service activity upon invocation;
     designation of at least one insight provided by a digital assistant used to invoke the service activity;
     designation of at least one intent used to invoke the service activity; and
     executable code executed upon invocation of the service activity;
   deploy the service activity as a service of the digital assistant, wherein access to the service activity is restricted to a designated set of authorized users;
   responsive to occurrence of the designated at least one insight performing operations comprising:
     identify a user associated with the at least one insight;
     determine whether the user associated with the at least one insight is authorized to utilize the service activity;
     responsive to determining the user associated with the at least one insight is authorized to utilize the service activity, invoke the service activity and provide the set of user data and the at least one insight to the invoked service activity;
   responsive to the occurrence of the at least one intent, performing operations comprising:
     identify a user associated with the at least one intent;
     determine whether the user associated with the at least one intent is authorized to utilize the service activity;
     responsive to determining the user associated with the at least one intent is authorized to utilize the service activity, invoke the service activity and provide the set of user data and the at least one intent to the invoked service activity.

9. The machine-readable medium of claim 8, wherein the instructions cause the machine to perform further operations comprising:
    identify a service provider associated with the service activity; and
    assess a cost to the service provider upon invocation of the service activity.

10. The machine-readable medium of claim 9, wherein the cost is based on resources utilized during execution of the service activity.

11. The machine-readable medium of claim 9, wherein the cost is based on transactions performed during execution of the service activity.

12. The machine-readable medium of claim 8, wherein determining whether the user associated with the at least one insight or the user associated with the at least one intent are authorized comprises comparing the user associated with the at least one insight or the user associated with the at least one intent, respectively, to a set of authorized users.

13. The machine-readable medium of claim 8 further comprising:
    responsive to determining the user associated with the at least one insight is authorized to utilize the service activity, performing further operations comprising:
        providing the service activity as an option to the user associated with the at least one insight in response to occurrence of the designated at least one insight;
        providing the service activity as an option to the user associated with the at least one intent in response to occurrence of the at least one intent; and
        wherein invocation of the service activity is further based upon user input in response to the option.

14. A computing system implementing a digital assistant comprising:
    a processor and executable instructions accessible on a machine-readable medium that, when executed, cause the system to perform operations comprising:
        receiving a plurality of service activities, at least one of which is a restricted service activity and at least one of which is an unrestricted service activity, each service activity comprising:
            designation of a set of user data to be provided to the service activity upon invocation;
            designation of at least one insight provided by the digital assistant used to invoke the service activity;
            designation of at least one intent used to invoke the service activity;
            and executable code executed upon invocation of the service activity;
        identifying a set of authorized users allowed to utilize the restricted service activity;
        deploy each service activity as a service of the digital assistant;
        responsive to occurrence of the designated at least one insight:
            identifying a user associated with the least one insight;
            comparing the user associated with the at least one insight to the set of authorized users;
            determining whether the set of user data to be provided to the service activity upon invocation is available;
            responsive to determining that the set of user data is available and to the user associated with the at least one insight being in the set of authorized users, invoking the service activity and providing the set of user data and the at least one insight to the service activity;
            responsive to determining that the set of user data is not available:
                requesting a user provide any missing data in the set of user data;
                responsive to receiving the missing data, invoking the service activity and providing the set of user data and the at least one insight to the service activity;
                responsive to not receiving the missing data, declining to invoke the service activity;
        responsive to occurrence of the at least one intent:
            identifying a user associated with the at least one intent;
            comparing the user associated with the at least one intent to the set of authorized users;
            determining whether the set of user data to be provided to the service activity upon invocation is available;
            responsive to determining that the set of user data is available and to the user associated with the at least one insight being in the set of authorized users, invoking the service activity and providing the set of user data and the at least one insight to the service activity;
            responsive to determining that the set of user data is not available:
                requesting a user provide any missing data in the set of user data;
                responsive to receiving the missing data, invoking the service activity and providing the set of user data and the at least one insight to the service activity;
                responsive to not receiving the missing data, declining to invoke the service activity.

15. The computing system of claim 14, wherein the service activity is deployed as a development service with access restricted to the set of authorized users.

16. The computing system of claim 14 wherein the service activity is deployed as a restricted service with access restricted to the set of authorized users.

17. The computing system of claim 14 wherein the service activity is deployed as an extension service with no restrictions on users that can access the service activity.

18. The computing system of claim 14 wherein only the restricted service activity is invoked based on the user being in the set of authorized users and wherein the operations of:
    identifying a user associated with the at least one intent;
    comparing the user associated with the at least one intent to the set of authorized users;
    identifying a user associated with the least one insight; and
    comparing the user associated with the at least one insight to the set of authorized users;
    are only performed for the restricted service activity.

19. The computing system of claim 14 wherein the executable instructions, when executed, cause the system to perform operations further comprising:
    identifying a service provider associated with the service activity; and
    assessing a cost to the service provider upon invocation of the service activity.

20. The computing system of claim 19 wherein the cost is based on transactions performed during execution of the service activity.

* * * * *